UNITED STATES PATENT OFFICE.

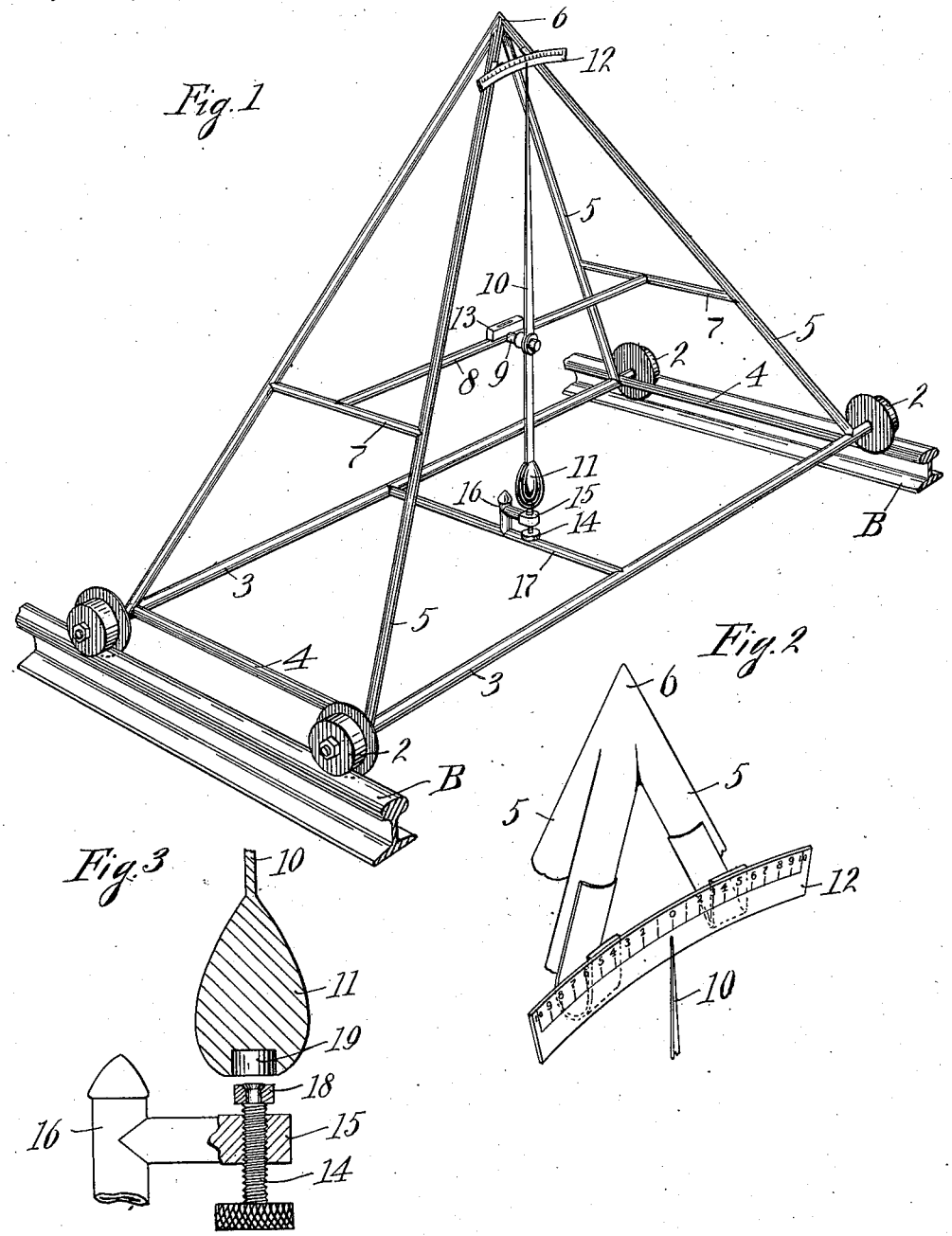

JAMES J. HILL, OF ST. PAUL, MINNESOTA.

TRACK-LEVEL MACHINE.

1,014,648. Specification of Letters Patent. Patented Jan. 16, 1912.

Application filed April 16, 1910. Serial No. 555,903.

*To all whom it may concern:*

Be it known that I, JAMES J. HILL, a citizen of the United States, residing at St. Paul, in the county of Ramsey and State of Minnesota, have invented certain new and useful Improvements in Track-Level Machines, of which the following is a specification.

My invention relates to improvements in track level and gage machines, its object being to provide an improved track level indicator which can be pushed along the track by hand to determine, and give continuous indications, whether the track is out of level, and, if so, how much.

To that end the invention consists in the construction, combination, and arrangement of parts hereinafter described and claimed.

In the accompanying drawings forming part of this specification, Figure 1 is a perspective view of a machine embodying the invention; Fig. 2 is a perspective view of a fragment of the upper part of the machine, showing the indicating scale; and Fig. 3 is a detail of the mechanism for holding the plumb bob from swinging when the machine is not in use.

In the embodiment of the invention shown in the drawings the machine comprises a skeleton pyramidal frame constructed throughout of thin tubes welded together to form a substantial support for the indicating appliances carried thereby. This structure has at the bottom a rectangular horizontal base which bridges the track rails B, upon which it is supported by means of wheels 2. These wheels are journaled upon the ends of the transverse front and rear members 3 of the base outside the side members 4 thereof, and are arranged with their flanges upon the inner sides of the rails. From each corner of the base a frame member 5 extends upwardly to the apex 6 of the pyramidal frame, at which point the meeting ends of these members are welded together. These frame members 5 are connected on either side of the machine by means of a longitudinal tie 7 arranged at a point about two fifths of the height of the machine, and these ties are in turn centrally connected by means of a transverse center tie 8.

Projected rearwardly from the middle point of the center tie 8 is a horizontal stud or pivot pin 9 upon which is pivotally mounted at a point between its ends a pointer or indicating needle 10. This pointer has at its lower end a weighted plumb bob 11, while its upper end extends up so as to overlap a sectoral scale plate 12 secured upon the rear of the frame just below the apex 6. Upon this plate is a scale graduated each way from its zero or middle point so as to indicate the number of inches or other units of measurement the frame is tilted up or down from the horizontal. It will be observed that the pointer is mounted far enough back of the axis of the pyramid to work freely across the face of the scale plate. To test the accuracy of the machine a small spirit level 13 is supported upon the center tie 8 near the pivot pin 9. When the spirit level indicates that the machine is level, the pointer should stand at zero on the scale above.

To prevent unnecessary and excessive oscillation of the pointer when the machine is not in use, a thumb screw 14 is threaded up through an arm 15 which projects laterally from a post 16 supported upon a tie 17 connecting the front and rear base members 3 at their middle points. Thus when the pointer stands at zero on the scale the plumb bob will be directly over the screw. Upon the upper end of the screw is a head 18 which will fit within the cylindrical socket 19 in the bottom of the plumb bob when the screw is screwed up, and keep it from swinging on its pivot. When the machine is to be used the screw 14 is screwed down out of engagement with the plumb bob so as to leave the pointer free to swing. The machine is then pushed along the track. If the two rails are level the base of the machine will remain horizontal, and the pointer will stand at zero on the scale. If one rail is lower than the other, the machine will tip down on that side, and the scale will move past the pointer, which, of course, remains vertical. The scale is so graduated that when the machine is tilted in this way the pointer will mark off the number of inches or other units of measurement one rail is lower than the other. As the pivot of the pointer is exactly half way between the rails, the scale reads from zero each way. And as the distance between the flanges of the wheels upon which the machine is mounted is the same as the standard gage for the track, any parts of the track which are narrower than the standard will be readily detected, as the rails will engage the flanges and stop the machine.

I claim as my invention:

1. A track level machine comprising a skeleton pyramidal frame of metal tubing, a pair of flanged wheels upon each side of the frame adapted to rest upon the rails of a railway track, a cross tie connecting the sides of the frame at a point about midway of their height, a scale secured upon the frame near the apex thereof, and a weighted pointer pivotally mounted on said cross tie and oscillating upon a longitudinal horizontal axis, the upper end of the pointer working over the face of the scale and the lower end reaching nearly to the bottom of the frame.

2. A track level machine comprising a pyramidal frame of metal tubing having at the bottom a rectangular base, wheels journaled upon the transverse members of the base, longitudinal ties connecting the converging side members on each side of the frame at a point about midway of their height, a cross tie connecting said longitudinal ties, a scale near the apex of the frame, and a pointer pivotally supported upon said cross tie and rotatable on a longitudinal horizontal axis, the upper end of the pointer working across the face of the scale.

3. A track level machine comprising a pyramidal frame of metal tubing, a pair of wheels journaled on each side of the frame and adapted to rest on the rails of a railway track, a scale secured to the frame near the apex thereof, a cross tie connecting the sides of the frame at a point about midway of the height thereof, a pointer pivotally supported on said tie and oscillating upon a longitudinal horizontal axis over the face of the scale, a plumb-bob upon the lower end of the pointer and formed with a socket in its bottom, and a thumb screw supported upon the base of the frame directly beneath the plumb-bob when the pointer stands at zero on said scale, the upper end of said thumb screw being adapted to fit within the socket in the plumb-bob.

In testimony whereof I affix my signature in presence of two witnesses.

JAMES J. HILL.

Witnesses:
 HENRY YANCY,
 M. R. BROWN.